(12) United States Patent
Mendonsa et al.

(10) Patent No.: US 11,074,933 B1
(45) Date of Patent: Jul. 27, 2021

(54) WRITE ONCE READ MANY DATA STORAGE DEVICES

(71) Applicant: Seagate Technology LLC, Fremont, CA (US)

(72) Inventors: Riyan A. Mendonsa, Edina, MN (US); Mehmet F. Erden, St. Louis Park, MN (US); Joshua W. Christensen, Savage, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/017,909

(22) Filed: Sep. 11, 2020

(51) Int. Cl.
*G11B 20/12* (2006.01)
*G11B 5/596* (2006.01)
*G11B 5/012* (2006.01)

(52) U.S. Cl.
CPC .......... *G11B 5/59655* (2013.01); *G11B 5/012* (2013.01)

(58) Field of Classification Search
CPC ......... G11B 5/035; G11B 5/5526; G11B 5/82; G11B 2220/2516; G11B 16/087; G11B 15/4676; G11B 5/54; G11B 5/59633; G11B 5/59638; G11B 5/58; G11B 5/59655; G11B 5/004; G11B 2020/183; G11B 20/1205; G11B 20/12; G11B 5/024; G11B 5/59688
USPC ................. 360/75, 48, 77.02, 77.07, 77.05
See application file for complete search history.

(56) References Cited

U.S. PATENT DOCUMENTS

| | | | |
|---|---|---|---|
| 6,693,760 B1 * | 2/2004 | Krounbi ................. | G11B 5/024 360/51 |
| 6,977,789 B1 * | 12/2005 | Cloke ................ | G11B 5/59633 360/17 |
| 8,223,452 B1 * | 7/2012 | Richgels ............ | G11B 5/59688 360/75 |
| 10,109,301 B1 * | 10/2018 | French, Jr. ........... | G11B 5/5526 |
| 10,332,557 B1 | 6/2019 | Mendonsa et al. | |
| 10,522,177 B1 | 12/2019 | Bellorado et al. | |
| 2006/0215310 A1 * | 9/2006 | Zayas ................ | G11B 5/59688 360/77.08 |

* cited by examiner

*Primary Examiner* — Nabil Z Hindi
(74) *Attorney, Agent, or Firm* — Faegre Drinker Biddle & Reath LLP

(57) ABSTRACT

A hard disk drive includes a magnetic writer and a magnetic recording medium, which includes data tracks with user data sections positioned between servo wedges. The servo wedges each can include multiple servo sectors. The hard disk drive also includes circuitry programmed to cause the magnetic writer to write user data to the multiple servo sectors in multiple servo wedges.

19 Claims, 6 Drawing Sheets

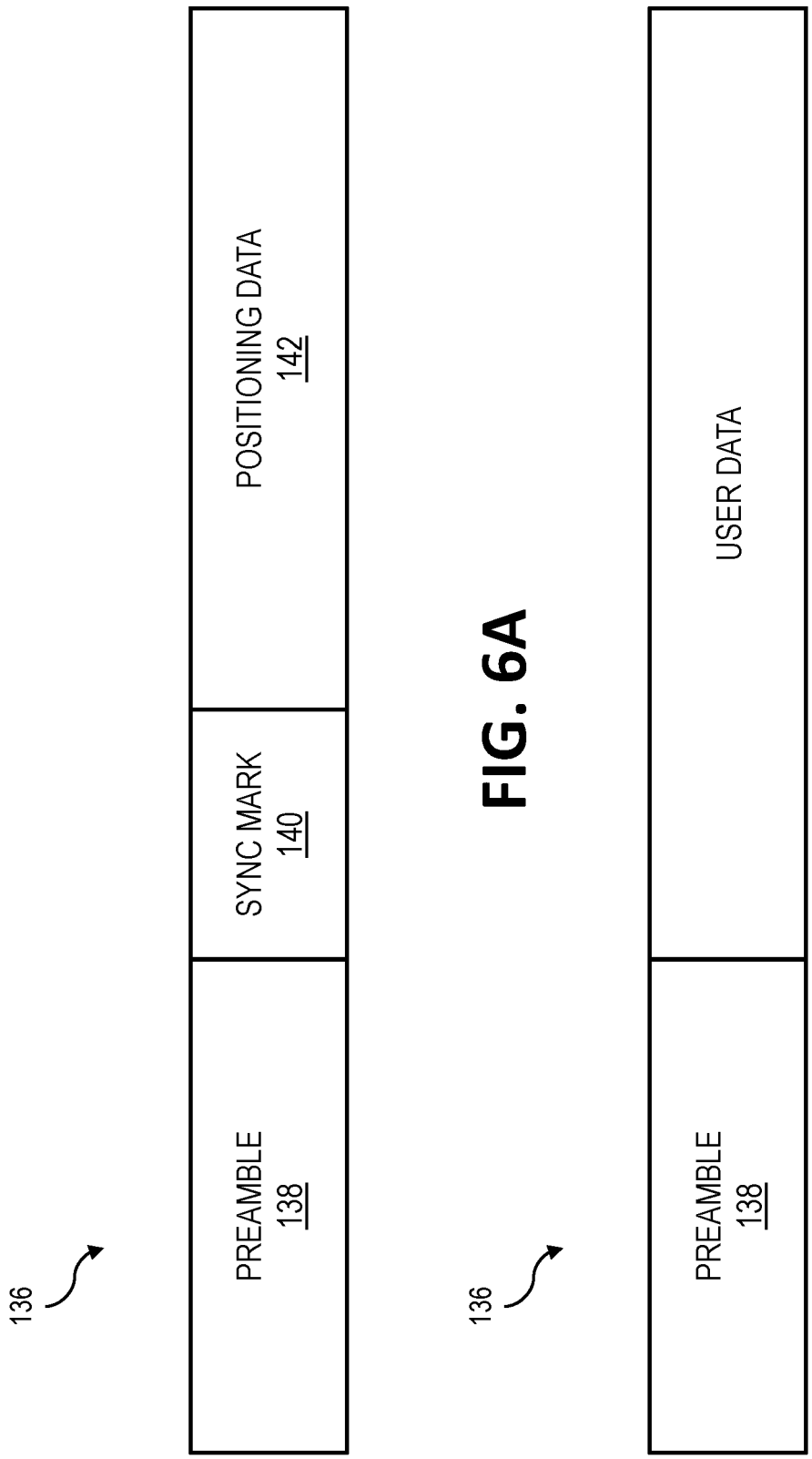

WRITE ONCE READ MANY DATA STORAGE DEVICES

SUMMARY

In certain embodiments, a method includes writing non-servo data in multiple servo wedges within a first data track on a magnetic recording medium.

In certain embodiments, hard disk drive includes a magnetic writer and a magnetic recording medium, which includes data tracks with user data sections positioned between servo wedges. The servo wedges each can include multiple servo sectors. The hard disk drive also includes circuitry programmed to cause the magnetic writer to write user data to the multiple servo sectors in multiple servo wedges.

In certain embodiments, an integrated circuit includes firmware for causing a magnetic writer to write, via emitted magnetic fields, non-servo data in multiple servo wedges within a first data track on a magnetic recording medium.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIGS. 6A and 6B shows schematics of a servo sector at different points in time, in accordance with certain embodiments of the present disclosure.

Figure 1:
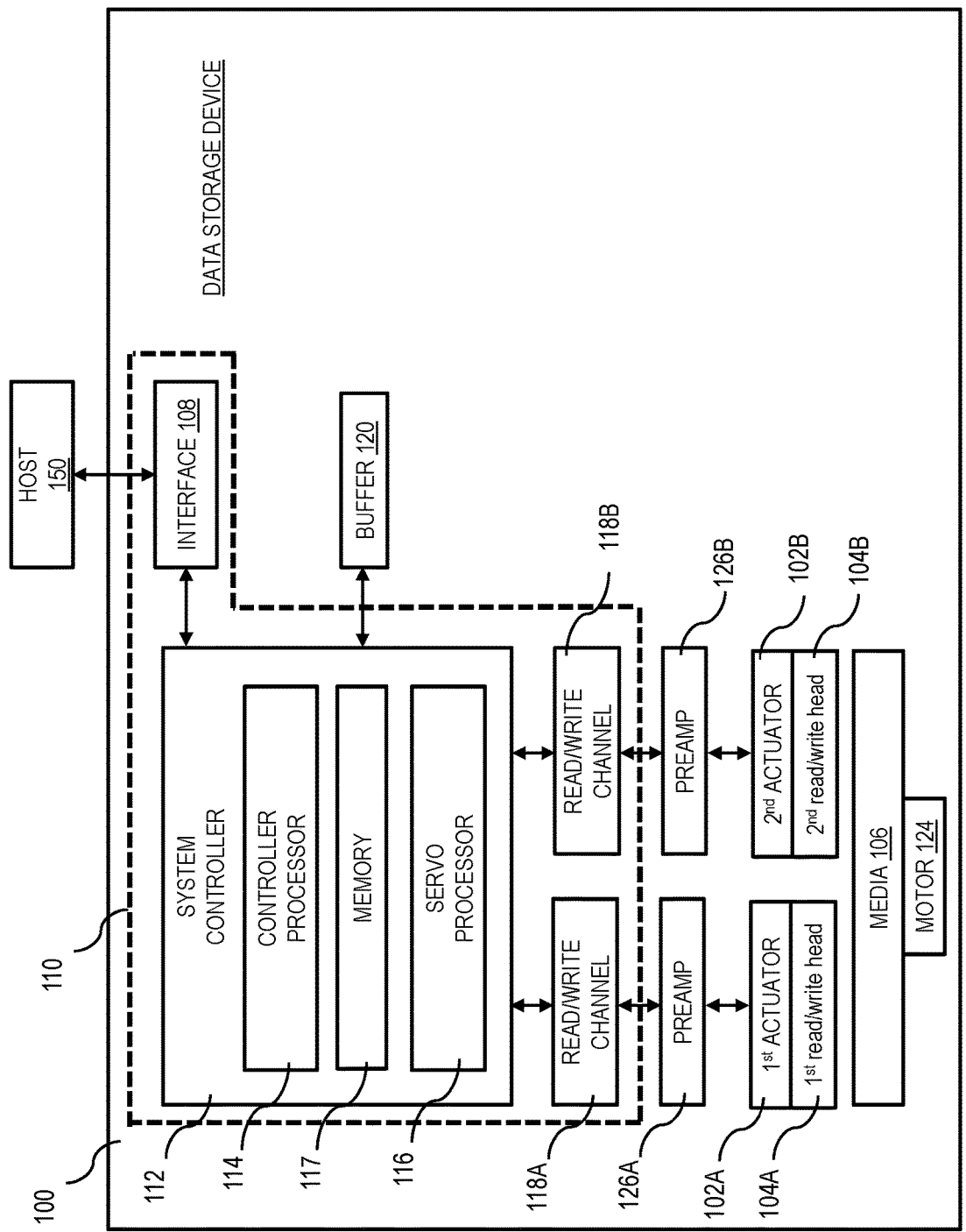
FIG. 1 shows a block diagram of a data storage device, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Data storage devices such as hard disk drives use servo control systems to position read/write heads above desired tracks on magnetic recording media for carrying out reading and writing operations. To help with positioning, servo control systems process servo data read from servo sectors, which form part of servo wedges on the magnetic recording media. The number of servo wedges in data storage devices has increased as the number of data tracks per square inch on magnetic recording media continues to increase. As a result, more area on the magnetic recording media is dedicated to servo data which reduces available area for user data. Certain embodiments of the present disclosure involve overwriting servo data with user data to increase the storage capacity of data storage devices.

FIG. 1 shows a schematic of a data storage device 100 such as a hard disk drive. In the case of a hard disk drive, the data storage device 100 can include multiple actuators (i.e., a first actuator 102A and a second actuator 102B) each with one or more read/write heads 104A and 104B to provide concurrent access to magnetic recording media 106 (multiple magnetic recording disks, which are referred to as a magnetic recording medium in the singular). In certain embodiments, the multiple actuators 102A and 102B share a common pivot axis and are positioned in a stacked arrangement. In such embodiments, the read/write heads 104A coupled to the first actuator 102A access different surfaces of the magnetic recording media 106 than the read/write heads 104B coupled to the second actuator 102B. In other embodiments, the multiple actuators 102A and 102B have separate pivot axes. In such embodiments, the read/write heads 104A coupled to the first actuator 102A can access the same magnetic recording media 106 as the read/write heads 104B coupled to the second actuator 102B. Although only two actuators for the data storage device 100 are shown in FIG. 1, additional actuators can be incorporated into the data storage device 100 or the data storage device 100 may have only one actuator.

The data storage device 100 includes an interface 108 (e.g., an input/output interface) for transferring data to and from the data storage device 100. For example, the interface 108, among other features, can be communicatively coupled between a host 150 (e.g., a data storage system such as a server or laptop) and the read/write heads 104A and 104B to facilitate communication, using a standardized communication protocol, between the read/write heads 104A and 104B and the host 150.

The data storage device 100 can include a system on a chip ("SOC") 110 (shown in dashed lines) that includes a system controller 112, which can include a controller processor 114 (e.g., a microprocessor), a servo processor 116 (e.g., a microprocessor), and memory 117 coupled to the controller processor 114 and the servo processor 116. The interface 108 may also be part of the SOC 110. The SOC 110 can also include one or more read/write channels 118A and 118B, which can encode data associated with write commands and decode data associated with read commands. The SOC 110 may be an integrated circuit such as an application-specific integrated circuit ("ASIC") and field-programmable gate array ("FPGA") that includes instructions (e.g., in the form of firmware) for carrying out various functions of the data storage device 100. For example, the SOC 110 can include circuitry to control and carry out various aspects of the data storage device 100 as described in more detail below. Although the interface 108, system controller 112, etc., are shown as being part of a single SOC, the components and their functions can be distributed among several integrated circuits.

The system controller 112 can be coupled to and control access to a buffer 120, which can temporarily store data associated with read commands and write commands. The buffer 120 can be a volatile memory, such as a dynamic random access memory ("DRAM"), static random access memory ("SRAM"), or other volatile memory.

During operation, the data storage device 100 receives various data transfer commands (e.g., a read command or a write command) from the host 150. Data associated with a write command may be received from the host 150 by the interface 108 and initially stored to the buffer 120. The data is encoded or otherwise processed by a respective read/write channel 118A and 118B and eventually stored to the magnetic recording media 106 via one of the read/write heads 104A or 104B coupled to the respective first actuator 102A and the second actuator 102B. For example, the magnetic writer portion of the read/write heads 104A and 104B can emit a magnetic field towards a surface of the magnetic recording media 106, which "writes" data in the form of magnetic transitions on the magnetic recording media 106. Data associated with a read command may be retrieved from the magnetic recording media 106 by the read sensor portion of the read/write heads 104A and 104B and stored in the buffer 120. For example, the read sensor may sense the magnetic transitions written to the magnetic recording media 106. Such data is then transferred to the host 150 by the interface 108.

The read/write channels 118A and 118B may be used to detect patterns within a signal and generate feedback based on the signal to adjust parameters of the read/write channels 118A and 118B. For example, as will be described in more detail below, servo sectors within servo wedges on the magnetic recording media 106 may include patterns to be detected and servo data to be used to identify a location of the read/write heads 104A and 104B relative to the magnetic recording media 106.

The data storage device 100 includes a servo control system (e.g., a servo control system 200 shown in FIG. 4) carried out by components of the system controller 112 (e.g., the servo processor 116 and the memory 117). The servo control system controls positioning (e.g., rotation) of the actuators 102A and 102B via a voice coil motor (VCM) assembly and can control actuation of microactuators to position the read/write heads 104A and 104B over a desired data track on the magnetic recording media 106 for reading and writing operations.

During operation, a spindle motor 124 rotates the magnetic recording media 106. The actuators 102A and 102B are driven by the VCM assembly to pivot around a pivot bearing. The VCM assembly and any microactuators are arranged to carry out various positioning operations (e.g., track seeking, track settling, track following) that position the read/write heads 104A and 104B over a desired data track of the magnetic recording media 106 to read data from or write data to the desired data track. For example, in response to a command to read data from or write data to a data track located a certain distance away from where a respective read/write head 104A or 104B is currently positioned (i.e., a track-seeking operation), a current may be applied to the voice coil of the VCM assembly to rotate the actuator 102A or 102B (and therefore the read/write head 104A or 104B) towards the desired data track. As the read/write head 104A or 104B nears the desired data track, less current is applied to the VCM assembly such that the read/write head 104A or 104B begins to settle over the desired data track (i.e., a track-settling operation). Once the read/write head 104A or 104B is positioned over the desired data track, the servo control system compensates for small positioning errors (i.e., a track-follow operation) to keep the desired read/write head 104A or 104B over the desired data track on the magnetic recording medium 106 during a read operation or a write operation.

In certain embodiments, the servo processor 116 controls operations of respective pre-amplifiers 126A and 126B, which provide signals to the read/write heads 104A and 104B for writing magnetic transitions to the magnetic recording media 106 and for receiving signals from the read/write heads 104A and 104B in response to detecting magnetic transitions written to the magnetic recording media 106.

Figure 2:
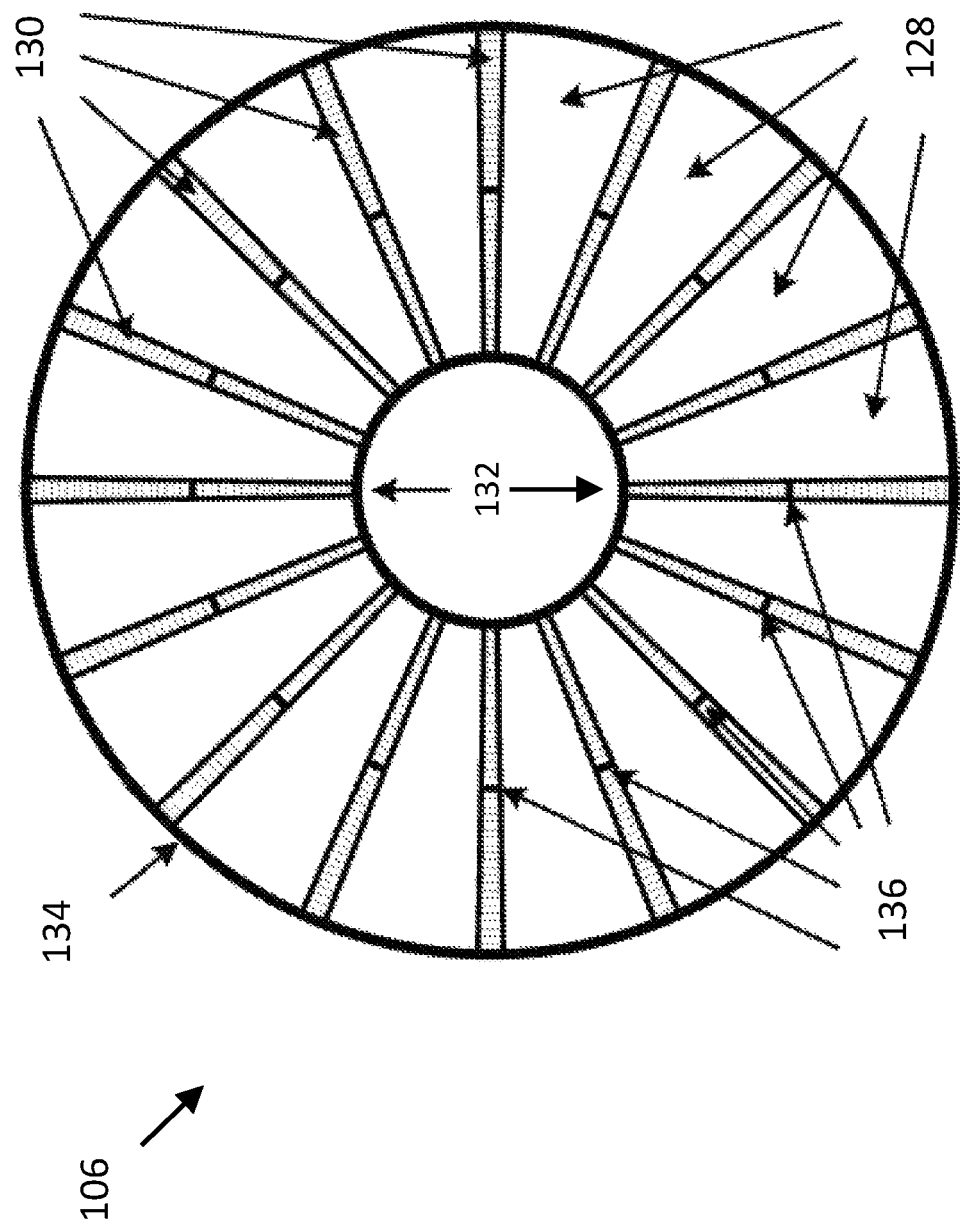
FIG. 2 shows a top view of a magnetic recording medium, in accordance with certain embodiments of the present disclosure.

FIG. 2 shows a top view of one side of one of the magnetic recording media 106. Data is written to the magnetic recording medium 106 along tracks, which may be sequentially numbered in accordance with their radial position. For example, track zero may be located adjacent to an outer diameter of the magnetic recording medium 106 and a last track may be located adjacent to an inner diameter of the magnetic recording medium 106.

The tracks of the magnetic recording medium 106 can include user data regions 128 and servo data regions 130 (which are sometimes referred to as servo wedges) positioned between the user data regions 128. The servo wedges 130 extend radially between an inner diameter 132 and an outer diameter 134 of the magnetic recording medium 106. Data on the magnetic recording media 106 is stored on data tracks which extend circumferentially around the top/bottom surfaces of each magnetic recording medium 106. The portion of the data tracks in the user data regions 128 store user data, and the portion of the data tracks in the servo wedges 130 are comprised of individual servo sectors 136 (some of which are shaded in FIG. 2), which store servo data. As such, each servo wedge 130 includes a plurality of servo sectors 136. As shown in FIG. 2, the servo wedges 130 can be positioned at regular intervals around the magnetic recording medium 106.

Figure 3:
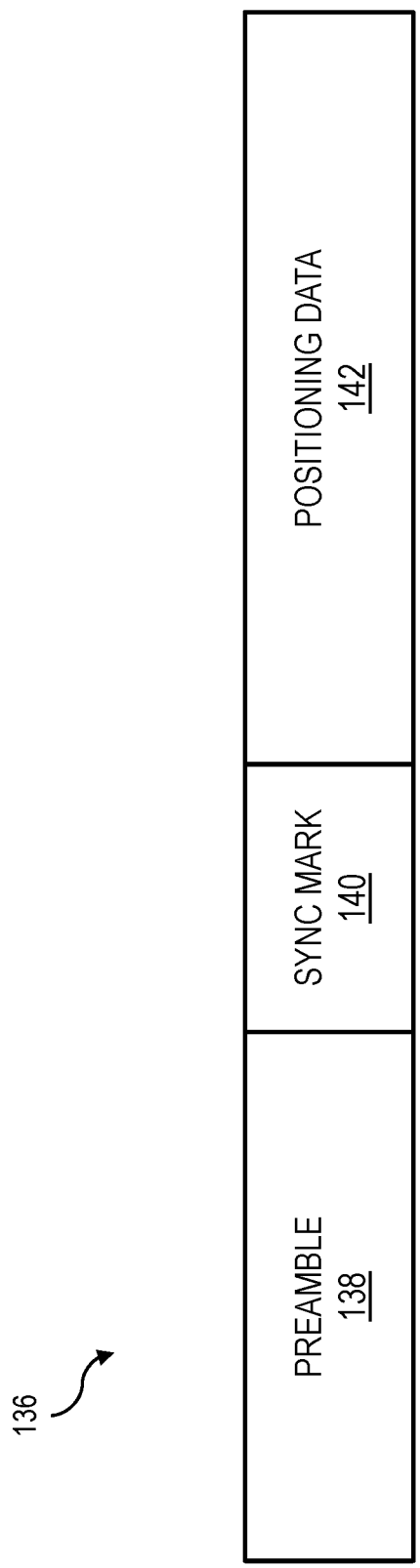
FIG. 3 shows a schematic of a servo sector, in accordance with certain embodiments of the present disclosure.

FIG. 3 shows an example of the type of servo data stored to the servo sectors 136. The servo sectors 136 can include a preamble 138 (e.g., a fixed pattern indicating the beginning of the servo sector 136) followed by what may be referred to as a sync mark 140 (e.g., a synchronization pattern) or a servo timing mark. For example, the preamble 138 may be written with an alternating pattern of magnetic transitions which, when read, generates a sine-wave like read-back signal. When the servo control system identifies the preamble 138, the servo control system may then search for an expected sync mark 140. Once the sync mark 140 is detected, the servo control system can then read positioning data 142 following the sync mark 140 from the servo sectors 136. The positioning data 142 specifies the physical radial and tangential location of the given servo sector 136 on the magnetic recording medium 106. As the read/write heads 104A and 104B pass over each servo sector 136, the servo sector's information is demodulated such that the position of the read/write heads 104A and 104B is known to the system controller 112.

Servo data is written to both sides of the magnetic recording medium 106 by, for example, a servo writer or disk writer before the magnetic recording medium 106 is installed in the data storage device 100 or by the data storage device 100 itself using a process referred to as self-servo track writing (SSW) or concentric SSW process. SSW may include using the electronics (e.g., the SOC 110) of the data storage device 100 to write the concentric servo sectors independent of an external servo writer.

Figure 4:
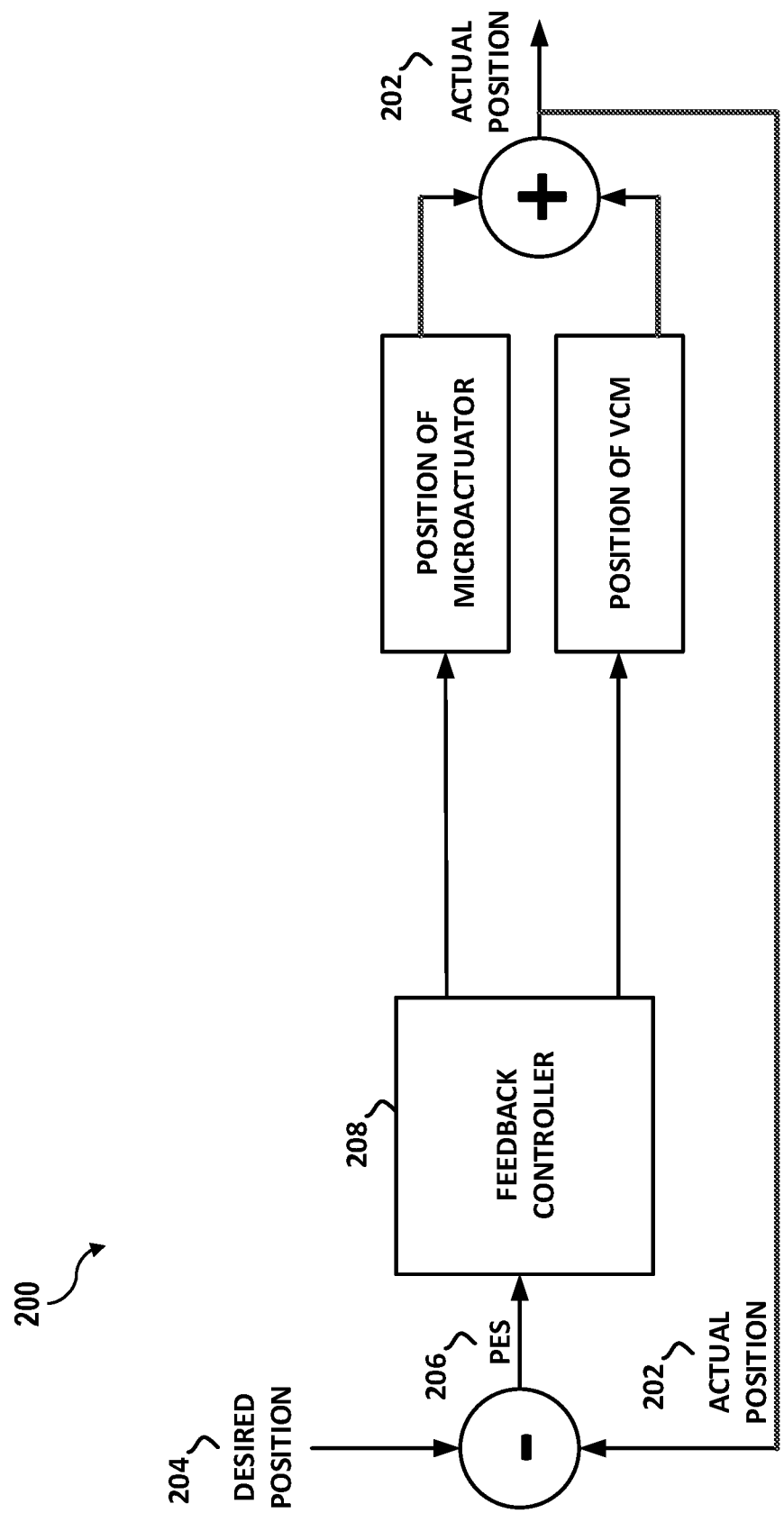
FIG. 4 shows a diagram of a servo control system, in accordance with certain embodiments of the present disclosure.

FIG. 4 provides a high-level representation of a servo control system 200. In operation, the read/write heads 104A and 104B read the positioning data 142 from the servo sectors 136 stored on the magnetic recording media 106 to determine an actual position 202 of the read/write heads 104A and 104B relative to tracks on the magnetic recording media 106. The actual position 202 of the read/write heads 104A and 104B is subtracted from a desired position 204 of the read/write heads 104A and 104B to determine a position error signal (PES) 206, which is the difference between where the read/write heads 104A is and should be positioned. The PES 206 is fed into a feedback controller 208, which controls current to the VCM assembly and—for some operations—controls voltage to the microactuators to position the read/write heads 104A and 104B over the desired track.

The read/write channels 118A and 118B, the preamplifiers 124A and 124B, and various components of the system controller 112 operate so that the servo data read by the read/write heads 104A and 104B can be processed and used by the data storage device 100 to maintain proper positioning of the read/write heads 104A and 104B.

As mentioned above, area on magnetic recording media 106 consumed by servo data is area that is not used for user data. One approach to increasing the space available for user data is to overwrite certain servo data, which is described in more detail below.

Figure 5B:
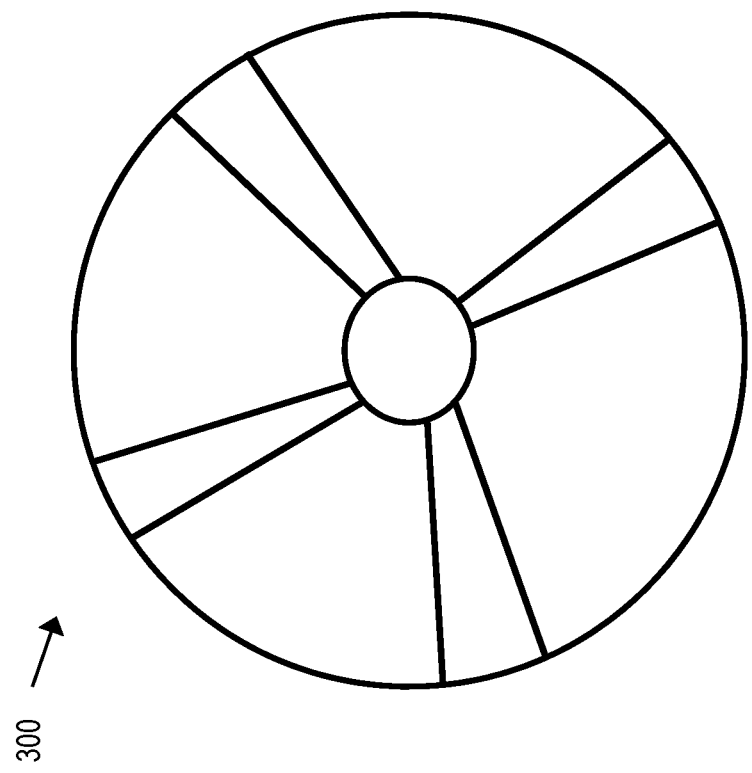
FIGS. 5A and 5B shows top views of a magnetic recording medium at different points in time, in accordance with certain embodiments of the present disclosure.
Figure 5A:
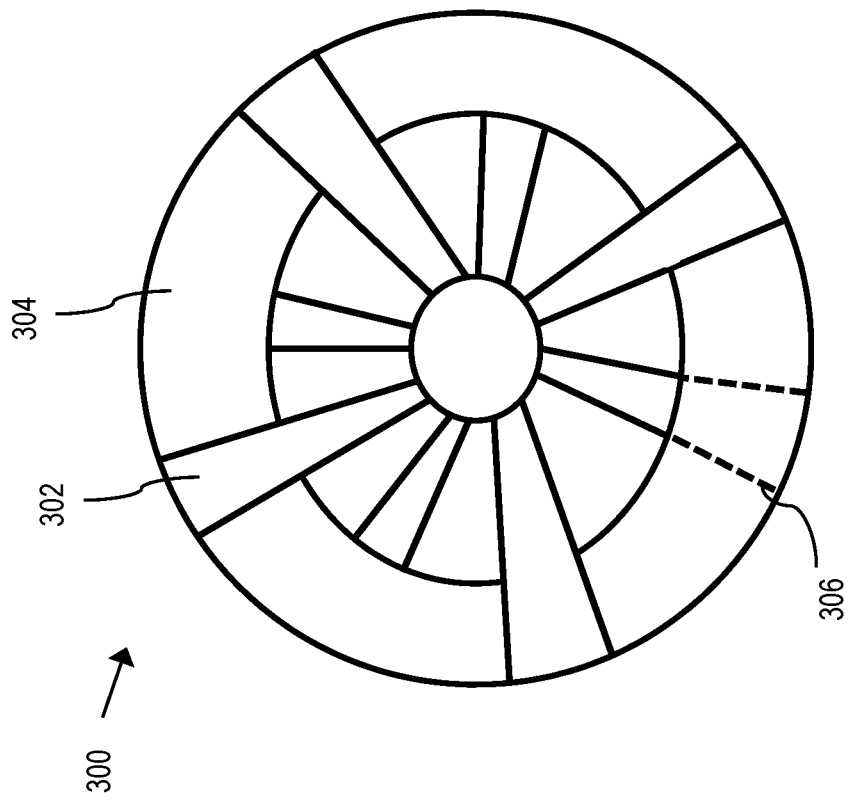

FIGS. 5A and 5B show schematics of one side of a magnetic recording medium 300 at different points in time. The magnetic recording medium 300 and the approaches described below can be used or carried out by the data storage device 100.

The magnetic recording medium 300 includes multiple servo wedges 302 with user sections 304 positioned therebetween. As such, a given data track will initially include multiple servo wedges 302 with servo data and multiple user sections 304 with user data. For simplicity of explanation, the magnetic recording medium 300 is shown with only eight relatively wide separate servo wedges 302 but it should be appreciated that, like the magnetic recording medium 106 shown in FIG. 2, many other servo wedges can be formed along the magnetic recording medium 300 and the servo wedges can be much smaller in size.

As described above and shown in FIG. 2, servo sectors are initially written to the servo wedges 302 that extend from the inner diameter of the disk to the outer diameter of the disk. However, as user data is written to the magnetic recording medium 300 over time, all or portions of the servo wedges 302 can be overwritten with user data to increase the available area for storing user data.

As one example, FIG. 5A shows that parts of some of the servo wedges 302 have been overwritten by user data. Four of the servo wedges 302 remain as initially written and extend completely from the inner diameter of the magnetic recording medium 300 to the outer diameter, while the other four servo wedges 302 have been at least partially overwritten with servo data. In FIG. 5A, the overwritten portion of one of those overwritten servo wedges 302 is represented in dotted lines 306.

In certain embodiments, during operation of the data storage device 100, the read/write heads 104A and 104B initially write user data to the tracks positioned near the outer diameter of the magnetic recording medium 300. Before overwriting data in the servo wedges 302, the read/write heads 104A and 104B read (or sense) the servo data in the servo wedges 302 to help ensure that the magnetic writer portion of a given read/write head is positioned over the desired data track.

Because the read portion of the read/write heads 104A and 104B is spaced and/or offset from the magnetic writer portion of the read/write heads 104A and 104B, the read portion and the magnetic writer portion may be positioned over different data tracks at a given point in time. As such, the read portion may read servo data from one data track, and the magnetic writer portion writes user data (including overwriting servo data) from another (e.g., adjacent) data track. In certain embodiments, the reading and writing occurs simultaneously. Once positioned over a desired data track, the magnetic writer portion can emit magnetic fields towards the magnetic recording medium 300 to write user data within the servo wedges 302 and the user sections 304. This process of overwriting servo data can continue until portions or all of some or all of the servo wedges 302 include user data.

In certain embodiments, entire servo wedges 302 (but only a subset of—or—all the servo wedges 302) are overwritten with user data, as shown in FIG. 5B. For example, as more user data is stored to the magnetic recording medium 300, certain servo wedges are overwritten further.

In certain embodiments, 25-50% of all servo wedges are overwritten with user data. In certain embodiments, 50% or more of servo wedges 302 are overwritten with user data. In certain embodiments, every other servo wedge 302 is overwritten with user data. In certain embodiments, one servo wedge 302 is maintain for every three servo wedges 302 overwritten with user data.

In certain embodiments, as shown when comparing FIGS. 6A and 6B, some portions of the servo sectors within the servo wedges 302 are not overwritten with user data. For example, FIG. 6A shows a schematic representation of a full servo sector 136 with the preamble 138, sync mark 140, and positioning data 142 (e.g., burst patterns). In certain embodiments, the sync mark 140 and/or the positioning data 142 can be overwritten with user data while the preamble 138 is not overwritten.

The particular approach (e.g., number, pattern, or percentage of servo wedges 302 or space overwritten with user data) can depend on the required performance of the data storage device 100 during read operations. In certain embodiments, although some or all of the servo wedges 302 are overwritten with user data, the user data can include locational information. For example, although a data track may not have servo wedges, the data track can include information about itself for coarse positioning (e.g., track number or track ID) and fine positioning so that the data storage device 100 can read and use that information for positioning.

Although writing user data in the servo wedges 302 increases capacity for user data, doing so can impair the ability to position the read/write heads 104A and 104B over desired data tracks. In particular, the ability to write data within along a desired data track is more likely to be impaired than the ability to read data from a data track. As such, in certain embodiments, once a given data track has been filled with user data (including user data that overwrites the intended servo data), that user data may not be overwritten with new user data to avoid unintentionally overwriting the wrong data. The written user data can be read multiple times, but the user data is written only once. In such embodiments, the data storage device 100 can be considered to be a write-once-read-many (WORM) data storage device.

Regardless of whether the data storage device 100 is programmed to utilize a WORM approach, other approaches can be used to further increase or help the ability to increase the amount of user data that can be stored to the magnetic recording medium.

As one example, in certain embodiments, the data storage device 100 runs a read-verify operation when reading data from a data track. For example, the data storage device 100 may read data from a data track multiple times (e.g., twice) to confirm it has read the desired or requested information from the correct data track. In certain embodiments, the read-verify operations are only carried out for data tracks with overwritten servo data. Embodiments that use multiple read/write heads 104A and 104B over each surface of the magnetic recording media 106 can reduce the time required for read-verify operations.

As another example, in certain embodiments, shingled magnetic recording (SMR) techniques can be used in the data storage device 100. Using SMR, adjacent data tracks are written to overlap with each. For example, after a first data track is written, a second track can be written to partially overlap the first data track. As a result, more data tracks can be fit to a given area of the magnetic recording medium 300.

As another example, the initial servo wedges 302 can be written at a higher density. When the servo wedges 302 are written at a higher density, the ability to position the magnetic writer over the desired data track and maintain a desired position can be improved. Although higher density servo wedges 302 would typically decrease the area available for user data, the available area would not be affected if some or all of the servo wedges 302 are overwritten with user data.

As another example, the read/write heads 104A and 104B can utilize multiple read sensors (e.g., multiple sensor magnetic recording (MSMR)). For example, multiple read sensors on each of the read/write heads 104A and 104B can be positioned relative to each other (e.g., spaced and offset) such that they both read the same data track.

In certain embodiments, if it is desired that a servo wedge be written (e.g., whether re-writing an overwritten servo wedge 302 or writing a new servo wedge 302), the data storage device 100 can be programmed with self-servo writing abilities. In such embodiments, the servo data can initially be overwritten such that certain seed servo wedges remain to help enable the self-servo writing capability.

As noted above, circuitry (e.g., the SOC 110) of the data storage device 100 can be programmed to carry out the various functions and steps described herein. For example, the circuitry can be programmed to cause the magnetic writer to write user data to the multiple servo sectors in multiple servo wedges as described herein. The circuitry may be programmed via firmware, which can include instructions for carrying out the various functions.

Various modifications and additions can be made to the embodiments disclosed without departing from the scope of this disclosure. For example, while the embodiments described above refer to particular features (e.g., data storage devices with dual actuators), the scope of this disclosure also includes embodiments having different combinations of features (e.g., data storage devices with a single actuator or four actuators) and embodiments that do not include all of the described features. Accordingly, the scope of the present disclosure is intended to include all such alternatives, modifications, and variations as falling within the scope of the claims, together with all equivalents thereof.

We claim:

1. A method comprising:
writing user data in multiple servo wedges within a first data track on a magnetic recording medium, the servo wedges including a preamble and positioning data, wherein the preamble is not overwritten by the user data, and wherein only the positioning data is overwritten by the user data; and
before writing the user data, reading servo data that is to be overwritten with the user data.

2. The method of claim 1, wherein the writing the user data is written while the servo data is read.

3. The method of claim 1, wherein the read servo data is within a second data track on the magnetic recording medium.

4. The method of claim 1, wherein the user data is written only to a portion of the servo wedges within the first data track.

5. The method of claim 4, wherein the user data is written to 50% or more of the servo wedges within the first data track.

6. The method of claim 1, further comprising:
writing user data in multiple servo wedges within additional data tracks that are positioned closer to an inner diameter of the magnetic recording medium than the first data track.

7. The method of claim 1, wherein the user data is written only to a portion of the servo wedges within the first data track.

8. A hard disk drive comprising:
a magnetic writer;
a magnetic recording medium including data tracks with user data sections positioned between servo wedges, the servo wedges each including multiple servo sectors; and
circuitry programmed to:
cause the magnetic writer to write user data to 50% or more of the servo wedges within the data tracks, and
cause the magnetic writer to not overwrite the user data with new user data.

9. The hard disk drive of claim 8, wherein the servo sectors each include a preamble and positioning data, wherein the circuitry is programmed to cause the magnetic writer to not write the user data to the preamble.

10. The hard disk drive of claim 8, wherein the circuitry is programmed to cause the magnetic writer to write the user data to only to a portion of the servo wedges within given data tracks.

11. The hard disk drive of claim 8, wherein the circuitry is programmed to cause the magnetic writer to write the user data to 50% or more of the servo wedges within the data tracks.

12. The hard disk drive of claim 8, wherein the circuitry is programmed to cause the magnetic writer to write the user data to all servo sectors of a given servo wedge.

13. The hard disk drive of claim 8, wherein the circuitry is programmed to cause the magnetic writer to write the user data to the servo sectors of a given servo wedge.

14. The hard disk drive of claim 8, further comprising a read sensor positioned adjacent to the magnetic writer, wherein the circuitry is programmed to cause the magnetic writer to write the user data to the servo sectors while the read sensor reads servo sectors from another data track.

15. The hard disk drive of claim 8, wherein the magnetic recording medium includes location information in the user data sections.

16. An integrated circuit comprising:
memory; and
firmware stored in the memory for causing a magnetic writer to write, via emitted magnetic fields, user data in only portions of only a subset of multiple servo wedges within data tracks on a magnetic recording medium, the portions including positioning data but not a preamble of the servo wedges.

17. The integrated circuit of claim 16, wherein the firmware is programmed to cause the magnetic writer to write the non-servo data to 50% or more of the servo wedges within the data tracks.

18. The integrated circuit of claim 17, wherein the non-servo data is user data.

19. The method of claim 1, further comprising:
reading servo information from a second data track while writing the user data to the first data track.

* * * * *